(No Model.)
C. F. PEASE.
VELOCIPEDE PEDAL.
No. 492,990. Patented Mar. 7, 1893.
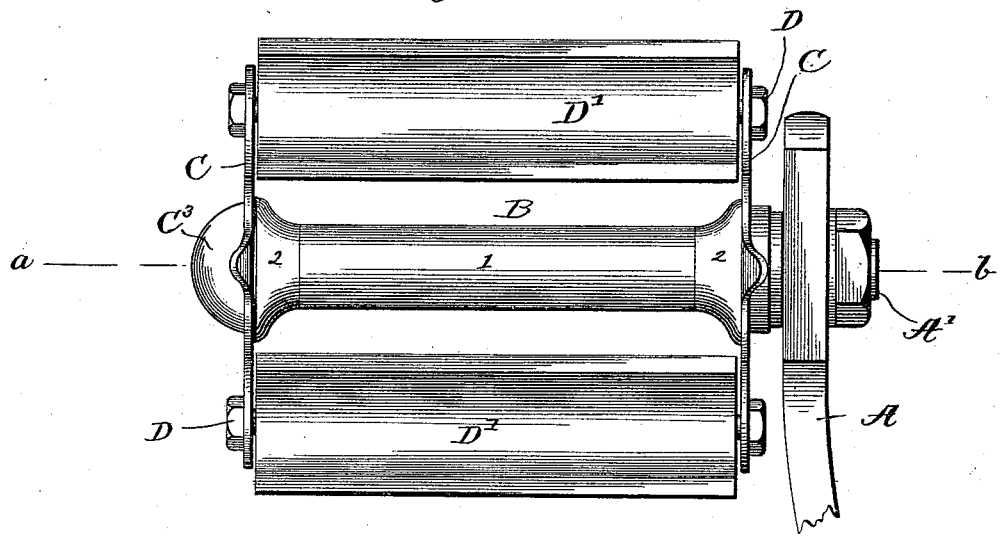
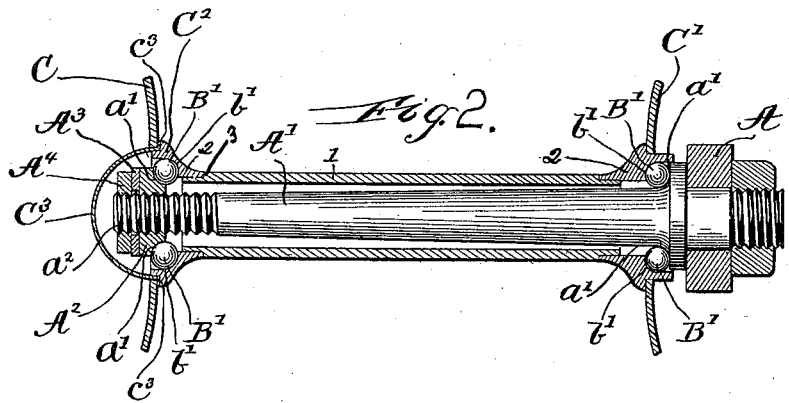
Witnesses:
Ambrose Risdon
Alice Lime
Inventor:
Charles F. Pease
By Cyrus Kehr
Atty.

UNITED STATES PATENT OFFICE.

CHARLES F. PEASE, OF CHICAGO, ILLINOIS, ASSIGNOR TO THE AMES & FROST COMPANY, OF SAME PLACE.

VELOCIPEDE-PEDAL.

SPECIFICATION forming part of Letters Patent No. 492,990, dated March 7, 1893.

Application filed October 22, 1892. Serial No. 449,603. (No model.)

*To all whom it may concern:*

Be it known that I, CHARLES F. PEASE, a citizen of the United States, residing at Chicago, in the county of Cook and State of Illinois, have invented certain new and useful Improvements in Velocipede-Pedals; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My improvement has for its object the sealing of the free end of the pedal, whereby waste of oil from the hub of the pedal and entrance of dust and sand to the hub of the pedal may be prevented.

In the accompanying drawings, Figure 1 is a plan of a pedal embodying my improvement. Fig. 2 is a section in line $a-b$ of Fig. 1.

A, is a portion of the arm supporting the pedal.

$A'$, is the pedal axle. This is applied to the arm, A, in any suitable manner.

B, is the hub of the pedal. This surrounds the axle, $A'$, and may or may not be separated from the latter by means of balls, $B'$. If such balls are used, the ends of the hub must be provided with annular oblique faces, $b'$, arranged in opposition to similar oblique faces, $a'$, supported by the axle, $A'$, in the well known manner, the face, $a'$, at the free end of the pedal being formed on a nut, $A^2$, surrounding the axle, $A'$, and engaged thereon by threads, $a^2$, on the axle, $A'$. Outside of said nut and also surrounding the axle, $A'$, may be the usual washer, $A^3$, and the jam-nut, $A^4$, for binding the nut, $A^2$, after the proper adjustment of the bearing has been made.

The hub, B, may be composed of a single piece or it may be composed of a tubular part, 1, and the expanded annular end-pieces, 2, extending over the ends of the tube, 1, and resting against the shoulders, 3, on said tube.

C, is the end-plate at the free end of the pedal.

$C'$, is the end-plate at the end of the pedal located next to the arm, A. At the free end of the pedal, the end of the hub has an annular seat, $C^2$, directed toward said free end.

$C^3$, is a dome-shaped cup extending over the free end of the axle, $A'$, the nuts, $A^4$, and $A^2$, and the washer, $A^3$, to the end of the hub and resting by its base against the said annular seat, $C^2$. At the base of said dome, there is preferably formed, integral with said dome, a narrow flange, $c^3$, extending outward from said dome parallel to and in contact with said seat, $C^2$. Said flange constitutes an expanded base.

The end-plate, C, is open at its middle sufficiently to extend over and fit snugly around the base of the dome, $C^3$, and against the flange, $c^3$, and bind said dome against the hub, B. Bolts, D, extend from the end-plates, $C'$, through the end-plates, C, and bind the latter against said dome. Suitable foot pieces, $D'$, are secured by the bolts, D. It will be seen, that said dome becomes a portion of the rotary part of the pedal, and that by its use the free end of the pedal is entirely sealed against escape of oil and against ingress of dust and sand. It is also to be observed, that the construction described is neat and simple; no threading or difficult shaping being required to fit the end-pieces, 2, to the tube, 1, or to fit the dome, $C^3$, and the end-plate, C, to the end of the hub. The end-pieces, 2, may be formed by drop forging or ordinary lathe work, and the dome, $C^3$, may be made by drop forging, stamping, spinning, or turning. The end-plates, C, may be formed by drop forging or stamping.

In re-adjusting the bearing of the pedal, the end-plate, C; and the dome, $C^3$, are removed.

I claim as my invention—

1. In a pedal, the combination with an axle, $A'$, of a hollow hub, B, surrounding said axle, a nut surrounding the free end of said axle, a dome, $C^3$, surrounding said nut and the free end of said axle and resting against a suitable annular seat on said hub, and an end-plate surrounding said dome and binding the latter to said seat, substantially as shown and described.

2. In a pedal, the combination of the axle, $A'$, of a hollow hub surrounding said axle, an adjusting nut surrounding the free end of said axle, an annular seat on the free end of said hub, a dome surrounding the free end of said axle and said nut and having an expanded base resting upon said seat, an end-plate surrounding said dome and resting against said expanded base, substantially as shown and described.

3. In a pedal, the combination with the axle, A', and a hub consisting of a tubular part, 1, and end-pieces, 2, of a nut, A², a dome, C³, having an expanded base, end-plate, C, extending over said dome and resting against said base, end-plate, C', located at the end of the pedal to which the pedal arm is to be attached, and suitable connections as bolts, D, extending from the end-plate, C', to the end-plate, C, substantially as shown and described.

4. In a pedal, the combination with the axle, A², and a hub consisting of a tubular part, 1, and end-pieces, 2, having oblique faces, $b'$, of balls, B', a nut, A², a dome, C³, having an expanded base, end-plate, C, extending over said dome and resting against said base, end-plate, C', located at the end of the pedal to which the pedal arm is to be attached, and suitable connections as bolts, D, extending from the end-plate, C', to the end-plate, C, substantially as shown and described.

In testimony whereof I affix my signature, in presence of two witnesses, this 11th day of October, 1892.

CHARLES F. PEASE.

Witnesses:
W. E. KING,
CYRUS KEHR.